United States Patent
Takahashi et al.

(10) Patent No.: US 7,695,668 B2
(45) Date of Patent: Apr. 13, 2010

(54) PROCESS FOR PRODUCING MOLDED OBJECT OF CURABLE RESIN AND MOLDED CURED RESIN

(75) Inventors: Haruhiko Takahashi, Tokyo (JP); Ryuta Kurihara, Tokyo (JP)

(73) Assignee: Zeon Corporation, Tokyo (JP)

( * ) Notice: Subject to any disclaimer, the term of this patent is extended or adjusted under 35 U.S.C. 154(b) by 163 days.

(21) Appl. No.: 11/817,269

(22) PCT Filed: Feb. 21, 2006

(86) PCT No.: PCT/JP2006/303078

§ 371 (c)(1),
(2), (4) Date: Aug. 28, 2007

(87) PCT Pub. No.: WO2006/092987

PCT Pub. Date: Sep. 8, 2006

(65) Prior Publication Data

US 2009/0008808 A1    Jan. 8, 2009

(30) Foreign Application Priority Data

Feb. 28, 2005    (JP) ............................... 2005-055123

(51) Int. Cl.
*B29C 33/40* (2006.01)

(52) U.S. Cl. ...................................... 264/337
(58) Field of Classification Search ................... 264/337
See application file for complete search history.

(56) References Cited

U.S. PATENT DOCUMENTS

| | | | | |
|---|---|---|---|---|
| 3,968,827 A | * | 7/1976 | Perevozkin et al. | 164/23 |
| 4,740,343 A | * | 4/1988 | Gaku et al. | 264/225 |
| 5,369,183 A | * | 11/1994 | Okada et al. | 525/289 |
| 5,464,585 A | * | 11/1995 | Fitzgibbon | 264/108 |
| 5,772,905 A | * | 6/1998 | Chou | 216/44 |

(Continued)

FOREIGN PATENT DOCUMENTS

JP    9268250 A    10/1997

(Continued)

OTHER PUBLICATIONS

International Search Report of PCT/JP2006/303078, date of mailing Apr. 4, 2006.

*Primary Examiner*—Joseph S Del Sole
*Assistant Examiner*—David N Brown, II
(74) *Attorney, Agent, or Firm*—Westerman, Hattori, Daniels & Adrian, LLP

(57) ABSTRACT

Provided are a method for producing molded articles of cured resin without deterioration of transferability and mold removability, as well as molded articles of cured resin obtained by the method. A method for producing molded articles of cured resin, including: (i) molding a first molded article of cured resin using a resin mold for the curable resin, the resin mold having been prepared by molding a resin composition containing an alicyclic structure-containing polymer and a hindered phenol compound, (ii) after use in the molding, heat-treating the resin mold for the curable resin, at a temperature lower by 5 to 60° C. than the glass transition temperature of the resin composition for a period of time in a range of 30 seconds to 100 hours, and (iii) molding a second molded article of the cured resin using the heat-treated resin mold for the curable resin.

6 Claims, 4 Drawing Sheets

U.S. PATENT DOCUMENTS

2009/0057960 A1 * 3/2009 Kashiwagi .................. 264/488

FOREIGN PATENT DOCUMENTS

| JP | 11106571 A | 4/1999 |
|---|---|---|
| JP | 2000108137 A | 4/2000 |
| JP | 2001310333 A | 11/2001 |
| JP | 2002179875 A | 6/2002 |
| JP | 200439136 A | 2/2004 |
| JP | 2004146007 A | 5/2004 |
| JP | 2004315676 A | 11/2004 |
| JP | 2005342927 A | 12/2005 |
| WO | WO 2006112062 | * 10/2006 |

* cited by examiner

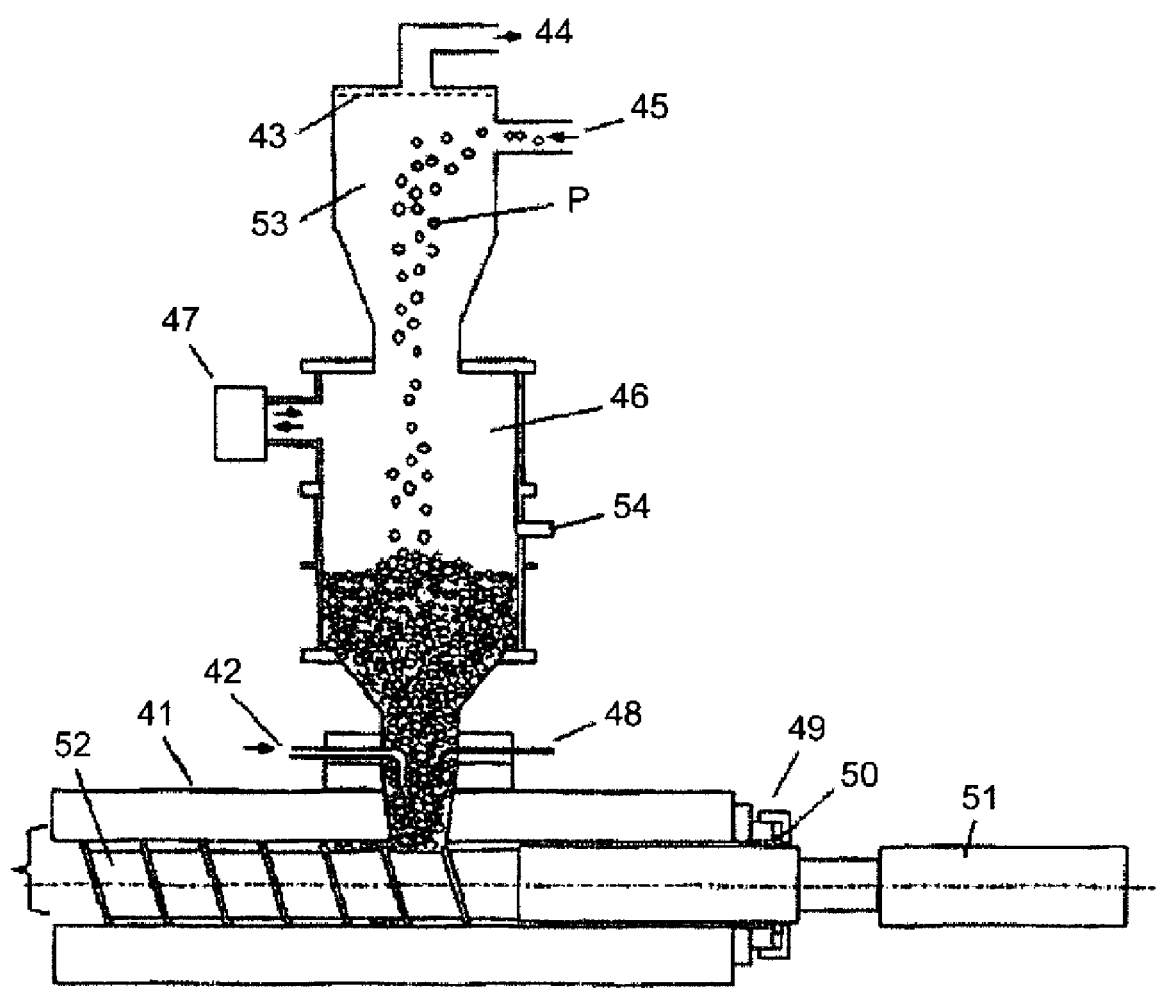

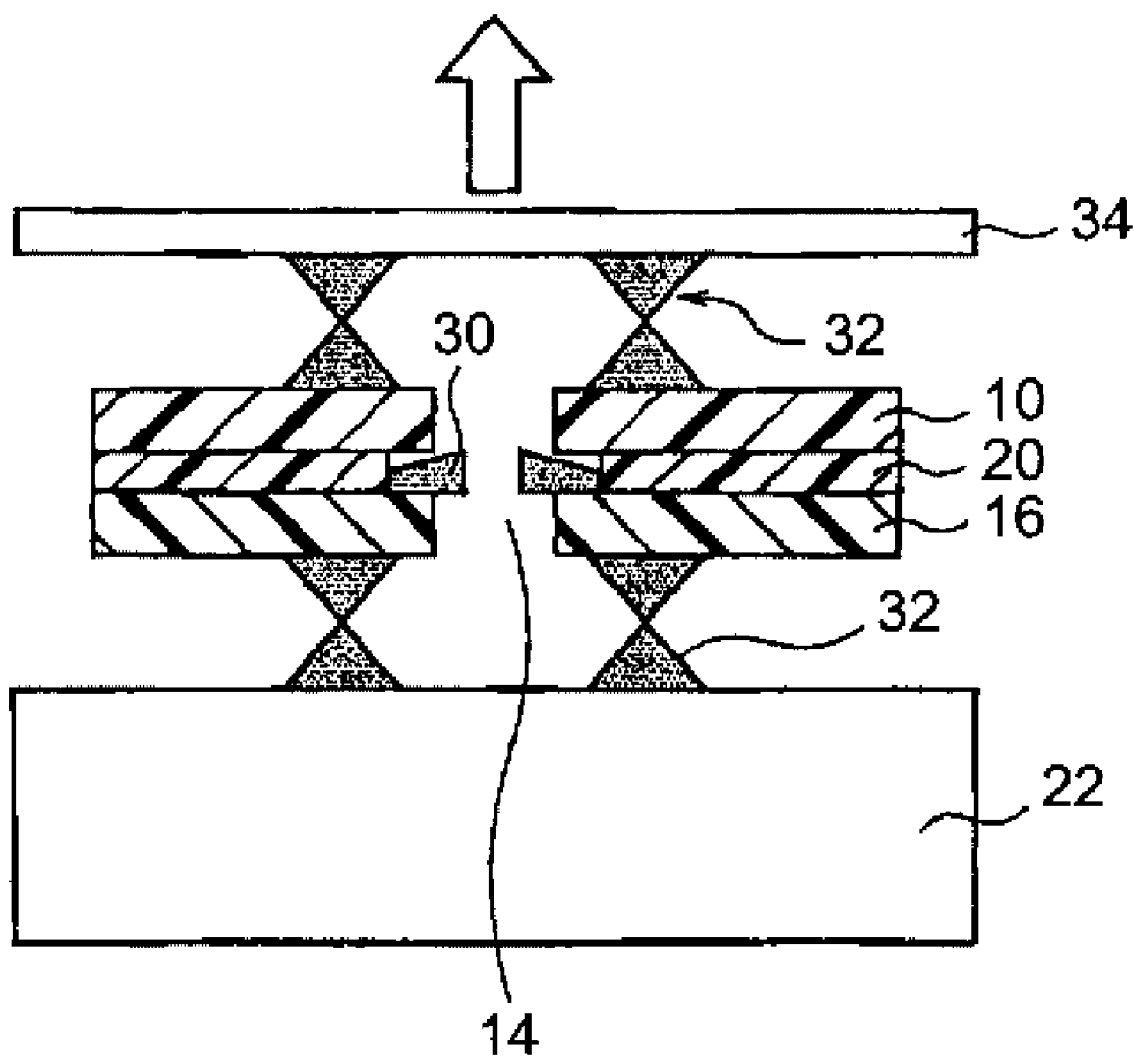

PROCESS FOR PRODUCING MOLDED OBJECT OF CURABLE RESIN AND MOLDED CURED RESIN

TECHNICAL FIELD

The present invention relates to a method for producing molded articles of cured resin, and to a molded article of cured resin obtained by the method. More particularly, the present invention relates to a method for producing a molded article by reusing a resin mold for curable resin, the mold being capable of keeping transferability and mold removability, and also relates to the molded article of the cured resin obtained by the method.

BACKGROUND ART

As a method for easily producing a resin molded article in a form of sheet or plate such as a compact disk, reticular lens, LED, Fresnel lens, prism sheet and light guide plate, there has been performed a method in which a curable resin such as acrylate is charged into a resin mold and then cured by irradiation with, e.g., ultraviolet rays to give a molded article of cured resin.

As a resin material of the resin mold for curable resin, there have conventionally been used polycarbonate or polymethacrylate. However, there are problems that the resin mold is deformed by humidity or reaction heat at the time of curing, thus causing the warpage of a microscopic concavo-convex shape of the resulting molded article of cured resin; when the resin mold for curable resin is removed from the molded article of cured resin, the molded article of cured resin, particularly in the case of a thin and large molded article of cured resin, is easily broken because of the poor removability of the resin mold for curable resin from the molded article of cured resin; and the concavo-convex shape cannot be sufficiently transferred.

In order to solve these problems, Patent Document 1 discloses use of a resin composition comprising an alicyclic structure-containing polymer as a resin composition for a resin mold for curable resin.

Patent Document 2 discloses use of amorphous polyolefin resin such as alicyclic structure-containing polymer resin as a resin composition for a resin mold for curable resin.

List Of Prior Art Documents

Patent Document 1: Japanese Patent Laid-open Publication No. 2000-108137

Patent Document 2: Japanese Patent Laid-open Publication No. 2004-039136

DISCLOSURE OF INVENTION

Problem to be Solved by the Invention

For reducing the costs and environmental burden caused by production of molded articles of cured resin, reuse of resin molds for curable resin is demanded.

However, when the present inventors conducted the molding and removal of a first molded article of cured resin having a microscopic concavo-convex shape by using the resin mold for curable resin described in the Patent Documents 1 and 2 and the further molding and removal of a second molded article of cured resin having a microscopic concavo-convex shape by using the resin mold for curable resin after use in the molding of the first molded article of cured resin, they found a problem that the peeling loading required for the mold to be removed from the second molded article of cured resin is increased, that is, the removability of the mold is lowered, and the microscopic concavo-convex shape of the mold is not sufficiently transferred to the second molded article of cured resin.

Accordingly, an object of the present invention is to provide a method for producing molded articles of cured resin by reusing a resin molded for curable resin not deteriorated transferability and mold removability, as well as molded articles of cured resin obtained by the method.

In order to solve the aforementioned problems, the present inventors have studied about additives for the resin composition containing alicyclic structure-containing compound for the resin mold for curable resin, and methods for reusing the mold. As a result, they have found out that use of a hindered phenol compound as an additive and treatment of the used resin mold for curable resin with heat enable recovery of transferability and removability of the mold, to thereby complete the present invention.

According to the present invention, there is thus provided a method for producing molded articles of cured resin, the method comprising:

(i) molding a first molded article of cured resin using a resin mold for the curable resin, the resin mold having been prepared by molding a resin composition containing an alicyclic structure-containing polymer and a hindered phenol compound, (ii) after use in the molding, heat-treating the resin mold for the curable resin, at a temperature lower by 5 to 60° C. than the glass transition temperature of the resin composition for a period of time in a range of 30 seconds to 100 hours, and (iii) molding a second molded article of the cured resin using the heat-treated resin mold for the curable resin.

It is preferable that the content of the hindered phenol compound in the resin composition is in a range of 0.2 to 0.9 wt % based on the total amount of the resin composition.

It is further preferable that, when a surface of the heat-treated resin mold for the curable resin, the surface being for contacting the curable resin, is measured with TOF-SIMS (time of flight secondary ion mass spectrometry), the relative intensity of the maximum peak in the mass range of 150 to 300 (m/z) with respect to a peak with a mass of 67 (m/z) is 0.05 or more.

It is further preferable that the resin mold for the curable resin has a concavo-convex shape on a surface thereof, the surface being for contacting the curable resin.

There is also provided a molded article of cured resin obtained as a result of the step (iii) in the aforementioned method for producing molded articles of cured resin. It is preferable that the article is a layer for constituting a multilayer optical recording information medium.

EFFECT OF THE INVENTION

According to the present invention, the used resin mold for curable resin is heat-treated and thereby restrained from undergoing deterioration in transferability and removability, whereby a molded article of cured resin having a microscopic concavo-convex shape can be produced again.

BRIEF DESCRIPTION OF DRAWINGS

FIG. 6 is a conceptual diagram of a resin molding apparatus used in Examples.

FIG. 7 is a conceptual diagram of a delamination tester used in the Examples.

EXPLANATIONS OF LETTERS OR NUMERALS

Figure 1:
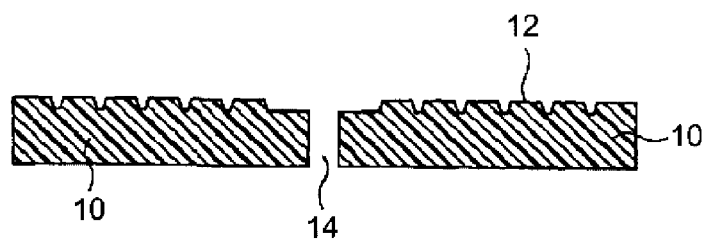
FIG. 1 is a structural sectional view showing one example of a resin mold for curable resin.

| | |
|---|---|
| 10 | Resin mold for curable resin for multilayer optical recording information medium |
| 11 | Substrate fro multilayer optical recording information media |
| 12 | Concavo-convex shape |
| 14, 18 | Opening |
| 16 | Base material |
| 20a | Ultraviolet curable resin |
| 20 | Molded article of cured resin |
| 22 | Support plate |
| 24 | Ultraviolet ray |
| 26 | Hook |
| 28 | Air blow |
| 30 | Wedge |
| 32 | Sucker |
| 34 | Upper supporting plate |
| 41 | Screw holder |
| 42 | Inactive gas injection device |
| 43 | Filter |
| 44 | Carrier gas exhaust pipe |
| 45 | Carrier pipe |
| 46 | Resin storage cylinder |
| 47 | Breather valve |
| 48 | Oximeter |
| 49 | Screw bearing |
| 50 | Ground packing |
| 51 | Drive system |
| 52 | Screw |
| 53 | Carrier gas/Resin separator |
| 54 | Level meter |
| 55 | Plasticization device |
| P | Resin composition |

BEST MODE FOR CARRYING OUT THE INVENTION

In the method for producing molded articles of cured resin according to the present invention, (i) a first molded article of cured resin is molded using a resin mold for the curable resin, the resin mold having been prepared by molding a resin composition containing an alicyclic structure-containing polymer and a hindered phenol compound, (ii) after use in the molding, the resin mold for the curable resin is heat-treated at a temperature lower by 5 to 60° C. than the glass transition temperature of the resin composition for a period of time in a range of 30 seconds to 100 hours, and (iii) a second molded article of the cured resin is molded using the heat-treated resin mold for the curable resin.

In the present invention, the resin mold for the curable resin is prepared by molding the resin composition comprising the alicyclic structure-containing polymer and the hindered phenol compound.

(Alicyclic Structure-containing Compound)

The alicyclic structure-containing polymer used in the present invention is a polymer containing an alicyclic structure in the repeating unit of the polymer, and may contain the alicyclic structure in either a main or side chain thereof.

The alicyclic structure may be a cycloalkane structure, a cycloalkene structure etc., among which a cycloalkane structure is preferable from the viewpoint of the thermal stability etc. of the polymer.

The number of carbon atoms constituting the alicyclic structure is usually in the range of 4 to 30, preferably 5 to 20, and more preferably 5 to 15. The aforementioned range of the number of carbon atoms is preferable in terms of the heat resistance of the resulting resin mold for the curable resin.

The ratio of the alicyclic structure-containing repeating unit in the alicyclic structure-containing polymer may be suitably selected depending on intended use and is usually 50 wt % or more, preferably 70 wt % or more, and more preferably 90 wt % or more. This ratio of the alicyclic structure-containing repeating unit in the alicycle structure-containing polymer is preferable in terms of the heat resistance of the resulting resin mold for curable resin.

Moieties other than the alicyclic structure-containing repeating unit in the alicyclic structure-containing polymer are selected suitably depending on intended use.

Specific examples of the alicyclic structure-containing polymer may include (A) norbornene type polymer, (B) monocyclic olefin polymer, (C) cyclic conjugated diene polymer, (D) vinyl alicyclic hydrocarbon polymer, and hydrides thereof.

Among those described above, the norbornene type polymer, cyclic conjugated diene polymer, vinyl alicyclic hydrocarbon polymer, and hydrides thereof are preferable from the viewpoint of the heat resistance, mechanical strength etc. of the resulting resin mold for the curable resin; the norbornene type polymer, vinyl alicyclic hydrocarbon polymer, and hydrides thereof are more preferable; and the hydrides of the norbornene type polymer are particularly preferable.

(A) Norbornene Type Polymer

The norbornene type polymer may be a ring-opened polymer of a norbornene type monomer, a ring-opened polymer of a norbornene type monomer with another monomer ring-opening-copolymerizable therewith, hydrides thereof, an addition polymer of a norbornene type monomer, and an addition polymer of a norbornene type monomer with another monomer copolymerizable therewith. Among those described above, the hydride of the ring-opened polymer of a norbornene type monomer is the most preferable from the viewpoint of the heat resistance, mechanical strength etc. of the resulting resin mold for the curable resin.

The norbornene type monomer in the present invention is a compound having a norbornene structure represented by formula (1):

[Formula 1]

Examples of the norbornene type monomer may include bicyclo[2.2.1] hept-2-ene (trivial name: norbornene) and derivatives thereof (those having a substituent on the ring thereof), tricyclo[4.3.0.1$^{2,5}$] deca-3,7-diene (trivial name: dicyclopentadiene) and derivatives thereof, tetracyclo [7.4.0.0$^{2,7}$.1$^{10,13}$] trideca-2,4,6,11-tetraene (trivial name: methanotetrahydrofluorene) and derivatives thereof, tetracyclo[4.4.0.1$^{2,5}$.1$^{7,10}$] dodec-3-ene (trivial name: tetracyclododecene) and derivatives thereof.

Examples of the substituent may include an alkyl group, an alkylene group, a vinyl group and an alkoxycarbonyl group. The norbornene type monomer may have two or more kinds of such groups.

Specific examples may include 8-methoxycarbonyl-tetracyclo[4.4.0.1$^{2,5}$.1$^{7,10}$] dodec-3-ene, 8-methyl-8-methoxycarbonyl-tetracyclo[4.4.0.1$^{2,5}$.1$^{7,10}$] dodec-3-ene, etc.

Among the substituents, nonpolar substituents such as an alkyl group, an alkylene group and a vinyl group are preferable from the viewpoint of the moisture resistance etc. of the resulting resin mold for the curable resin.

These norbornene type monomers are used singly or as a mixture of two or more thereof.

Examples of other monomers ring-opening-copolymerizable with the norbornene type monomer may include monocyclic olefin monomers such as cyclohexene, cycloheptene and cyclooctene. Such other monomers ring-opening-copolymerizable with the norbornene type monomer are used singly or as a mixture of two or more thereof.

The ring-opened polymer of the norbornene type monomer or the ring-opened polymer of the norbornene type monomer with another monomer ring-opening-copolymerizable therewith may be obtained by polymerizing the monomer components in the presence of a known ring-opening polymerization catalyst.

Examples of the ring-opening polymerization catalyst may include a catalyst consisting of a metal halide such as ruthenium or osmium halide, a nitrate or an acetylacetone compound and a reducing agent; and a catalyst consisting of a metal halide such as titanium, zirconium, tungsten or molybdenum halide or an acetylacetone compound and a co-catalyst such as an organoaluminum compound.

The hydride of a ring-opened polymer of a norbornene type monomer may be obtained usually by adding a known hydrogenation catalyst containing a transition metal such as nickel, palladium or the like to a polymer solution of the ring-opened polymer and then hydrogenating its carbon-carbon unsaturated bond.

The addition polymer of a norbornene type monomer, or the addition polymer of a norbornene type monomer with another monomer addition-copolymerizable therewith may be obtained usually by (co)polymerizing these monomers using a known addition polymerization catalyst such as a catalyst consisting of a titanium, zirconium or vanadium compound and an organoaluminum compound.

Examples of other monomers addition-copolymerizable with a norbornene type monomer may include α-olefins having 2 to 20 carbon atoms such as ethylene, propylene, 1-butene, 1-pentene, 1-hexene, 1-octene, 1-decene, 1-dodecene, 1-tetradecene, 1-hexadecene, 1-octadecene and 1-eicocene, and derivatives thereof; cycloolefins such as cyclobutene, cyclopentene, cyclohexene, cyclooctene and 3a,5,6,7a-tetrahydro-4,7-methano-1H-indene, and derivatives thereof; and non-conjugated dienes such as 1,4-hexadiene, 4-methyl-1,4-hexadiene, 5-methyl-1,4-hexadiene and 1,7-octadiene. Preferable are α-olefins, particularly ethylene.

These other monomers addition-copolymerizable with a norbornene type monomer may be used alone or as a mixture of two or more thereof. When the norbornene type monomer is addition-polymerized with the aforementioned other monomer addition-copolymerizable therewith, the weight ratio of a structural unit derived from the norbornene type monomer and a structural unit derived from the aforementioned other monomer copolymerizable therewith in the addition polymer is suitably selected in the range of usually 30:70 to 99:1, preferably 50:50 to 97:3, and more preferably 70:30 to 95:5.

(B) Monocyclic Olefin Polymer

Examples of the monocyclic olefin polymer may include addition polymers of monocyclic olefin monomers such as cyclohexene, cycloheptene, cyclooctene etc.

(C) Cyclic Conjugated Diene Polymer

Examples of the cyclic conjugated diene polymer may include a polymer obtained by 1,2- or 1,4-addition polymerization of a cyclic conjugated diene monomer such as cyclopentadiene or cyclohexadiene, and hydrides thereof.

The molecular weight of the norbornene type polymer, monocyclic olefin polymer and cyclic conjugated diene polymer is suitably selected depending on intended use. The polyisoprene- or polystyrene-equivalent weight-average molecular weight thereof determined in a cyclohexane solution (or a toluene solution is used when the polymer resin is not dissolved in cyclohexane) by gel permeation chromatography may be in the range of usually 5,000 to 500,000, preferably 8,000 to 200,000, and more preferably 10,000 to 100,000. The weight-average molecular weight in this range is preferable in that the moldability of the resulting resin composition and the mechanical strength of the resulting resin mold for curable resin are balanced at high degree.

(D) Vinyl Alicyclic Hydrocarbon Polymer

Examples of the vinyl alicyclic hydrocarbon polymer may include polymers of a vinyl alicyclic hydrocarbon monomer such as vinyl cyclohexene, vinyl cyclohexane etc., and hydrides thereof; and a polymer of a vinyl aromatic monomer such as styrene, α-methyl styrene etc. whose aromatic moiety is hydrogenated; and may also include a copolymer such as a random copolymer or block copolymer consisting of a vinyl alicyclic hydrocarbon or a vinyl aromatic monomer with another monomer copolymerizable therewith, or a hydride thereof. Examples of the block copolymer may include, but not limited to, di-block, tri-block or more multi-block or inclination block copolymer.

The molecular weight of the vinyl alicyclic hydrocarbon polymer is suitably selected depending on intended use. The polyisoprene- or polystyrene-equivalent weight-average molecular weight thereof in a cyclohexane solution (or a toluene solution is used when the polymer resin is not dissolved in cyclohexane), as determined by gel permeation chromatography, is in the range of usually 10,000 to 300,000, preferably 15,000 to 250,000, and more preferably 20,000 to 200,000. The weight-average molecular weight in this range is preferable in that the moldability of the resulting resin composition and the mechanical strength of the resulting resin mold for curable resin are balanced at high degree.

The melt mass flow rate (MFR) of the alicyclic structure-containing polymer used in the present invention is not particularly limited, but is preferably in the range of 1 to 100 g/10 min., more preferably in the range of 2 to 70 g/10 min., and still more preferably in the range of 3 to 50 g/10 min. The MFR in this range is preferable in terms of the moldability of the resulting resin mold of curable resin.

The melt mass flow rate (MFR) in the present invention is a value measured in accordance with JIS-K 7210 under the conditions of a temperature of 280° C. and a loading of 2.16 kg.

The glass transition temperature (Tg) of the alicyclic structure-containing polymer used in the present invention may be selected suitably depending on intended use, but is preferably 70° C. or more, more preferably in the range of 100 to 250° C., still more preferably in the range of 100 to 200° C., and most preferably in the range of 100 to 140° C. The Tg in this range is preferable in that the kneading property of the polymer, the moldability of the resulting resin composition, and the heat resistance of the polymer and the resulting resin mold for curable resin are balanced at high degree.

The content of the alicyclic structure-containing polymer in the resin composition used in the present invention is usually 50 to 99.99 wt %, preferably 80 to 99.99 wt %, more preferably 85 to 99.9 wt %, and still more preferably 95 to 99.5 wt %.

(Hindered Phenol Compound)

The hindered phenol compound used in the present invention is a phenol compound having an alkyl substituent at the ortho position.

Examples of the hindered phenol compound may include α-tocopherol, butylhydroxytoluene, cinapyl alcohol, n-octadecyl-β-(4'-hydroxy-3',5'-di-tert-butylphenyl) propionate, 2-tert-butyl-6-(3'-tert-butyl-5'-methyl-2'-hydroxybenzyl)-4-methylphenyl acrylate, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-P-cresol), 2,2'-ethylidene-bis(4,6-di-tert-butylphenol), 2,2'-butylidene-bis(4-methyl-6-tert-butylphenol), 4,4'-butylidenebis(3-methyl-6-tert-butylphenol), triethylene glycol-N-bis-3-(3-tert-butyl-4-hydroxy-5-methylphenyl) propionate, 1,6-hexanediolbis-[3-(3,5-di-tert-butyl-4-hydroxyphenyl) propionate], pentaerythritol tetrakis[3-3,5-di-t-butyl-4-hydroxyphenyl) propionate], bis[2-tert-butyl-4-methyl 6-(3-tert-butyl-5-methyl-2-hydroxybenzyl) phenyl] terephthalate, 3,9-bis-{2-[3-(3-tert-butyl-4-hydroxy-5-methylphenyl) propionyloxy]-1,1-dimethylethyl}-2,4,8,10-tetraoxaspiro[5,5] undecane, 1,1,3-tris(2-methyl-4-hydroxy-5-tert-butylphenyl) butane, 1,3,5-trimethyl-2,4,6-tris(3,5-di-tert-butyl-4-hydroxybenzyl) benzene, and tetrakis[methylene-3-(3',5'-di-tert-butyl-4-hydroxyphenyl) propionate] methane. Among these, particularly preferable are hindered phenol compounds whose constituent elements are exclusively carbon, oxygen and hydrogen.

The hindered phenol compounds may be used alone or as a mixture of two or more thereof.

The content of the hindered phenol compound in the resin composition used in the present invention is preferably in the range of 0.05 to 5 part by weight, more preferably in the range of 0.05 to 3 part by weight, still more preferably in the range of 0.05 to 2 part by weight, and most preferably in the range of 0.1 to 1 part by weight, based on 100 part by weight of the alicyclic structure-containing polymer.

The content of the hindered phenol compound in this range is preferable in terms of the resistance of the resin mold to oxidative deterioration upon molding of the resin mold itself, the resistance of the resin mold to contamination due to metal mold upon molding of the resin mold itself, and the transparency of the resin mold.

The molecular weight of the hindered phenol compound used in the present invention is preferably in the range of 300 to 2000, and more preferably in the range of 400 to 1500, but not particularly limited.

The molecular weight of the hindered phenol compound in this range is preferable in terms of the resistance of the resin mold to contamination by metal mold upon molding of the resin mold itself and the transparency of the resin mold.

(Resin Composition)

The resin composition used in the present invention comprises an alicyclic structure-containing polymer and a hindered phenol compound.

If necessary, the resin composition may further contain various additives.

Examples of the additives may include stabilizers such as an antioxidant, a heat stabilizer, a weathering stabilizer; resin modifiers such as a plasticizer; antistatic agents such as carbon nanotube and various surfactants; lubricants; and other kinds of polymers (rubber and resin). These additives may be used singly or as a mixture of two or more thereof, and the amount of these additives is selected suitably in such a range that the object of the present invention is not hindered.

Examples of the aforementioned other kinds of polymers (rubber and resin) may include olefin polymers such as polyethylene, and polypropylene; isobutylene polymers such as polyisobutylene, and isobutylene/isoprene rubber; diene polymers such as polybutadiene, polyisoprene, a butadiene/styrene random copolymer, an isoprene/styrene random copolymer, an acrylonitrile/butadiene copolymer, an acrylonitrile/butadiene/styrene copolymer, a butadiene/styrene block copolymer, a styrene/butadiene/styrene block copolymer, an isoprene/styrene block copolymer, and a styrene/isoprene/styrene block copolymer; acrylate polymers such as polybutyl acrylate, and polyhydroxyethyl methacrylate; vinyl compound polymers such as polyvinyl alcohol, polyvinyl acetate, and a vinyl acetate/styrene copolymer; epoxy polymers such as polyethylene oxide, polypropylene oxide, and epichlorohydrin rubber; and fluorine polymers such as vinylidene fluoride rubber, and ethylene tetrachloride/propylene rubber etc. These other types of polymers may have a crosslinked structure or may have a functional group introduced therein by reaction of degeneration. Among the polymers described above, the diene polymer is preferable, and particularly a hydride of the diene polymer whose carbon-carbon unsaturated bond is hydrogenated is preferable in terms of rubber elasticity, mechanical strength, flexibility and dispersibility.

Examples of the method for producing the resin composition used in the present invention may include a method for obtaining a pelleted resin composition by kneading the alicyclic structure-containing polymer, the hindered phenol compound, and additives to be incorporated if necessary; and a method for obtaining a resin composition by mixing, in a suitable solvent, the alicyclic structure-containing polymer, the hindered phenol compound, and additives to be incorporated if necessary, and then removing the solvent.

For kneading, melt kneaders such as a single-screw extruder, a twin-screw extruder, a Banbury mixer, a kneader, and a feeder ruder may be used. The kneading temperature is preferably in the range of 180 to 400° C., and more preferably in the range of 200 to 350° C. For kneading, the respective components may be added all at once and kneaded. Alternatively, the components may be added stepwise in divided portions while kneading.

The tensile elongation of the resin composition used in the present invention is not particularly limited, but is preferably in the range of 30 to 200%, more preferably in the range of 40 to 180%, and still more preferably in the range of 100 to 150%.

The tensile elongation of the resin composition in this range is preferable in terms of easy mold removal and prevention of breakage of the resin mold for curable resin because the resin mold for curable resin can be deformed upon removing the resin mold for curable resin from the molded article of cured resin.

The tensile elongation (%) in the present invention is a value measured in accordance with ASTM D-638 under the condition of a stress rate of 5 mm/min.

The melt mass flow rate (MFR) of the resin composition used in the present invention is not particularly limited, but is preferably in the range of 1 to 100 g/10 min., more preferably in the range of 2 to 70 g/10 min., and still more preferably in the range of 3 to 50 g/10 min. The MFR in this range is preferable in terms of the transferability of a convexo-concave shape of a metal mold onto the resin mold for curable resin.

The melt mass flow rate (MFR) in the present invention is a value measured in accordance with JIS-K 7210 under the conditions of a temperature of 280° C. and a loading of 2.16 kg.

(Resin Mold for Curable Resin)

The resin mold for curable resin used in the present invention may be produced by molding the resin composition by any of molding methods known in the art.

Examples of the molding method may include injection molding, press molding, extrusion blow molding, injection blow molding, multilayer blow molding, connection blow molding, double-wall blow molding, stretch blow molding, vacuum molding, rotational molding, etc. Among these, injection molding and press molding are preferable because of less in-plane variation in the concavo-convex shape. Press molding may be performed by heating and pressurizing a sheet, a film or the like which has been prepared by melt extrusion, in a metal mold having a concavo-convex shape to be molded.

The molding conditions are suitably selected depending on the molding method and the resin composition to be used.

The resin temperature is usually 100 to 400° C., preferably 200 to 380° C., and more preferably 200 to 370° C. The injection pressure is usually 0.1 to 100 MPa, preferably 0.5 to 50 MPa.

The shape of the resin mold for curable resin used in the present invention is selected suitably depending on the shape of the molded article of cured resin to be produced, and preferably has a concavo-convex shape on the surface thereof for contacting the curable resin. In this specification, the term "concavo-convex" refers, for convenience' sake, to a shape having a concave portion and/or a convex portion on a roughly flat surface or a curve constituting the inner surface of the mold and includes a shape having only either one of concave portions or convex portions on a flat surface.

The thickness of the resin mold for curable resin used in the present invention is not particularly limited, and is preferably in the range of 0.3 to 2 mm, more preferably in the range of 0.3 to 1.5 mm, and still more preferably in the range of 0.5 to 1.0 mm.

The thickness of the resin mold for curable resin in this range is preferable in that because the resin mold for curable resin has suitable flexibility so that when the resin mold for curable resin is removed from the molded article of cured resin, the resin mold for curable resin can be deformed for release and thus easily removed while the surface of the molded article of cured resin does not tend to be damaged.

(Curable Resin)

The curable resin used in the present invention may be, but is not limited to, thermosetting resin and resin curable by active energy. In particular, the resin curable by active energy is preferable, and an ultraviolet-curable resin is more preferable.

Examples of the thermosetting resin may include phenol resin, urea resin, diallyl phthalate resin, melamine resin, guanamine resin, unsaturated polyester resin, polyurethane resin, epoxy resin, amino alkyd resin, melamine-urea co-condensation resin, silicon resin, polysiloxane resin etc. If necessary, a curing agent such as a crosslinking agent, a polymerization initiator etc., a polymerization accelerator, a solvent, a viscosity modifier etc. may be added to, and used with, these resins.

The resin curable by active energy is a resin having a prepolymer, an oligomer and/or a monomer having a polymerizable unsaturated bond or an epoxy group in the molecule thereof which is curable by radiation of an energy ray. The active energy ray refers to rays among microwaves or charged particle beams, which have energy quantum capable of polymerizing or crosslinking molecules. Usually, ultraviolet rays or electron beams are used as the active energy ray.

Examples of the prepolymer and oligomer having a polymerizable unsaturated bond or an epoxy group in the molecule thereof may include unsaturated polyesters such as a condensate of unsaturated dicarboxylic acid and polyvalent alcohol; methacrylates such as polyester methacrylate, polyether methacrylate, polyol methacrylate, melamine methacrylate etc.; acrylates such as polyester acrylate, epoxy acrylate, urethane acrylate, polyether acrylate, polyol acrylate, melamine acrylate etc.; and cation-polymerizable epoxy compounds.

Examples of the monomer having a polymerizable unsaturated bond or an epoxy group in the molecule thereof may include styrene monomers such as styrene, and α-methyl styrene; acrylates such as methyl acrylate, ethyl acrylate, 2-ethylhexyl acrylate, methoxyethyl acrylate, butoxyethyl acrylate, butyl acrylate, methoxybutyl acrylate, and phenyl acrylate; methacrylates such as methyl methacrylate, ethyl methacrylate, propyl methacrylate, methoxyethyl methacrylate, ethoxymethyl methacrylate, phenyl methacrylate, and lauryl methacrylate; unsaturated substituted amino alcohol esters such as 2-(N,N-diethylamino)ethyl acrylate, 2-(N,N-dimethylamino)ethyl acrylate, 2-(N,N-dibenzylamino)methyl acrylate, and 2-(N,N-diethylamino)propyl acrylate; unsaturated carboxylic acid amides such as acrylamide, and methacrylamide; multifunctional acrylates such as ethylene glycol diacrylate, propylene glycol diacrylate, neopentyl glycol diacrylate, 1,6-hexane diol diacrylate, triethylene glycol diacrylate, dipropylene glycol diacrylate, ethylene glycol diacrylate, propylene glycol dimethacrylate, diethylene glycol dimethacrylate, 2-hydroxy acrylate, 2-hexyl acrylate, phenoxyethyl acrylate, ethylene glycol diacrylate, 1,6-hexane diol diacrylate, trimethylol propane triacrylate, pentaerythritol triacrylate, pentaerythritol tetraacrylate, and dipentaerythritol hexaacrylate; and polythiols having 2 or more thiol groups in the molecule thereof, such as trimethylol propane trithioglycolate, trimethylol propane trithiopropiolate, and pentaerythritol tetrathioglycolate. In the present invention, a prepolymer, an oligomer and/or a monomer, having a polymerizable unsaturated bond or an epoxy group in the molecule thereof may be used alone or as a mixture of two or more thereof.

The resin curable by active energy usually contains a polymerization initiator together with the prepolymer or oligomer having a polymerizable unsaturated bond or an epoxy group in the molecule thereof.

The polymerization initiator may be any of a heat-polymerization initiator and a photopolymerization initiator, and is preferably a photopolymerization initiator from the viewpoint of productivity. Examples of the heat-polymerization initiator may include benzoyl peroxide, diisopropyl peroxy carbonate, t-butyl peroxy (2-ethylhexanoate), etc. Examples of the photopolymerization initiator may include carbonyl compounds such as benzoin, benzoin monomethyl ether, benzoin isopropyl ether, acetoin, benzophenone, P-methoxy benzophenone, diethoxy acetophenone, benzyl dimethyl ketal, 2,2-diethoxy acetophenone, 1-hydroxy cyclohexyl phenyl ketone, methylphenyl glyoxylate, ethylphenyl glyoxylate, 2-hydroxy-2-methyl-1-phenylpropan-1-one, 2-ethyl anthraquinone; sulfur compounds such as tetramethylthiuram monosulfide; and acyl phoshine oxides such as 2,6-dimethyl benzoyl diphenyl phosphine oxide, 2,4,6-trimethyl benzoyl phenyl phosphine oxide, etc.

These polymerization initiators may be used alone or as a mixture of two or more thereof.

The amount of the polymerization initiator incorporated is selected suitably depending on intended use, and is usually in the range of 0.001 to 5 part by weight, preferably 0.01 to 1 part by weight, based on 100 part by weight of the polymerizable monomer. The amount of the polymerization initiator incorporated in this range is preferable since it enables uniform curing of a large molded article, and production of a colored product with high productivity without spots or yellowing.

(Molding of Molded Articles of Cured Resin Using the Resin Mold for Curable Resin)

The method for producing the molded articles of cured resin according to the present invention comprises molding a first molded article of cured resin using the resin molded for curable resin, and further molding a second molded article of cured resin using the resin mold for curable resin which has been used in the first molding.

The procedure itself for molding the molded articles of cured resin using the resin mold for curable resin is not particularly limited.

Examples of the procedure may include a method in which a cavity formed in the resin mold for curable resin is charged with the curable resin, the curable resin is then cured to form the molded article of cured resin, and then the resin mold for curable resin is removed from the molded article of cured resin; a method in which a cavity formed in a combination of the resin mold for curable resin and another resin mold for curable resin or a metal mold is charged with the curable resin, the curable resin is then cured to form the molded article of cured resin, and then the resin mold for curable resin is removed from the molded article of cured resin; and a method in which the curable resin is applied onto a substrate, then the resin mold for curable resin according to the present invention is laid on the resulting coating layer, the curable resin is cured, and then the resin mold for curable resin is removed from a complex consisting of the substrate and the curable resin.

The procedure for curing the curable resin is not particularly limited, and the examples thereof may include a method in which curable resin containing a polymerizable monomer and a photopolymerization initiator is cured by irradiation with active energy rays or the like; and a method in which thermosetting resin containing a polymerizable monomer and a heat-polymerization initiator is cured by heating.

One example of the method for molding the molded article of cured resin using the resin mold for curing resin will be described below in more detail with reference to the accompanying drawings.

First, a resin mold 10 for curable resin shown in FIG. 1 is prepared. This resin mold is transparent and has a shape of a disk with concavo-convex shape 12 which is to be transferred to a molded article of cured resin constituting a multilayer optical recording information medium having, on the surface thereof, grooves or a concavo-convex shape with high surface precision. This resin mold also has an opening 14 in the central portion thereof.

Figure 2A:
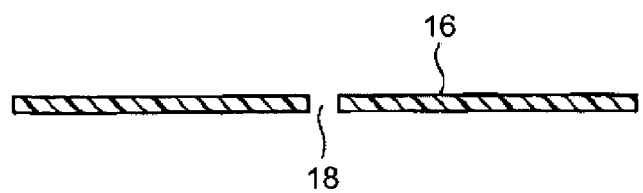
FIG. 2A is a sectional view showing a production step of a molded article of cured resin for multilayer optical recording information medium having a concavo-convex shape on the surface thereof by using a resin mold for curable resin.

Separately, as shown in FIG. 2A, a substrate 16 is prepared. The substrate 16 has a disk-shaped structure having an opening 18 in the central portion thereof. The material of the substrate 16 may be glass, ceramics, synthetic resin, etc.

Although the substrate shown in FIG. 2A is in a shape of a disk, the substrate is not particularly limited with respect to the shape and material thereof insofar as it can carry a layer of curable resin. The substrate may be a single layer or a lamination made of a plurality of layers.

Figure 2B:
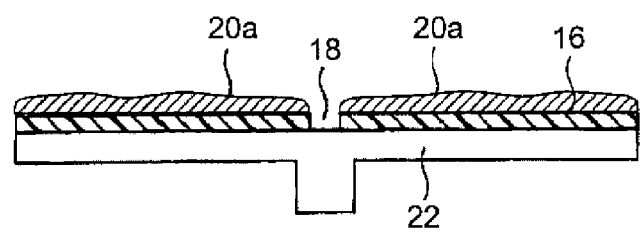
FIG. 2B is a sectional view showing a production step of a molded article of cured resin for multilayer optical recording information medium having a concavo-convex shape on the surface thereof by using a resin mold for curable resin.

Subsequently, as shown in FIG. 2B, the substrate 16 is set on a support plate 22, and an ultraviolet curing resin 20a is applied onto the substrate 16. The method for applying the curable resin 20a is not particularly limited, and a known coating method may be used. Examples of the coating method may include a wire bar coating method, a dipping method, a spraying method, a spin coating method, a roll coating method, etc.

Figure 3C:
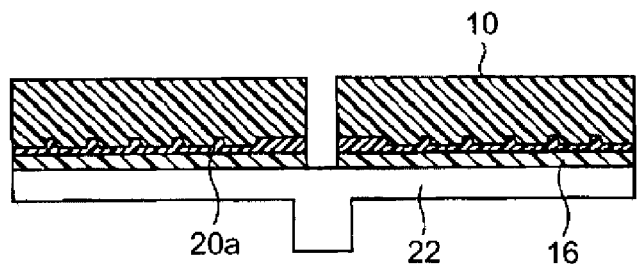
FIG. 3C is a sectional view showing a production step of a molded article of cured resin for multilayer optical recording information medium having a concavo-convex shape on the surface thereof by using a resin mold for curable resin.

Subsequently, as shown in FIG. 3C, the ultraviolet ray-curing resin 20a is sandwiched between the substrate 16 and the resin mold for curable resin 10 with the surface having grooves or concavo-convex shape 12 facing the substrate 16.

Figure 3D:
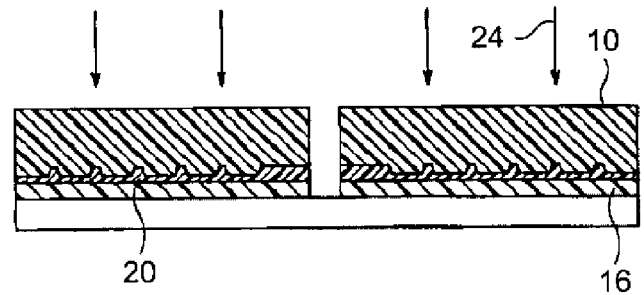
FIG. 3D is a sectional view showing a production step of a molded article of cured resin for multilayer optical recording information medium having a concavo-convex shape on the surface thereof by using a resin mold for curable resin.

Subsequently, as shown in FIG. 3D, the curable resin 20a is cured by irradiation with ultraviolet ray 24 downwards in the vertical direction, to form a cured resin layer 20 on the substrate 1b.

Figure 4E:
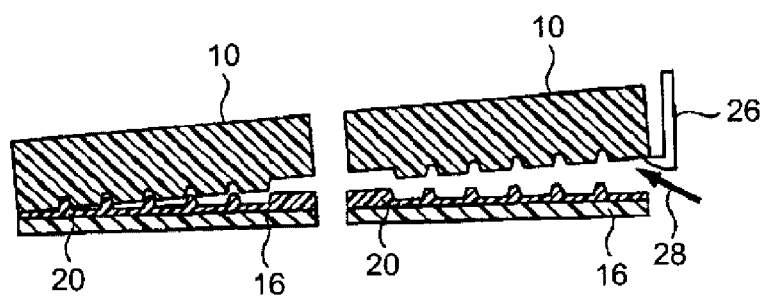
FIG. 4E is an explanatory view of a procedure of removing, from a cured resin layer, a resin mold for curable resin for multilayer optical recording information medium in a process of producing a molded article of cure resin for multilayer optical recording information medium having a concavo-convex shape on the surface thereof.
Figure 4F:
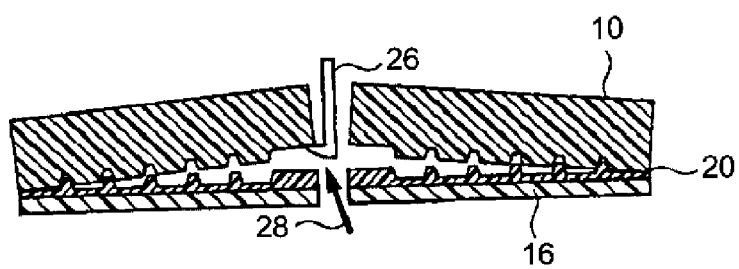
FIG. 4F is an explanatory view of a procedure of removing, from a cured resin layer, a resin mold for curable resin for multilayer optical recording information medium in a process of producing a molded article of cured resin for multilayer optical recording information medium having a concavo-convex shape on the surface thereof.

Finally, the resin mold for curable resin 10 is removed from the cured resin layer 20. In the removing of the mold, as shown in FIGS. 4E and F, a part of the outer circumferential edge or inner circumferential edge of the resin mold for curable resin 10 is lifted up with an unciform hook 26 and then a jet of air blow 28 is applied to thereby remove the mold.

Figure 5A:
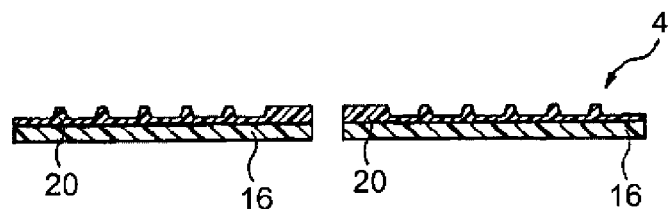
FIG. 5A is a sectional view, observed in the horizontal direction, of a molded article of cured resin for multilayer optical recording information medium having a concavo-convex shape on the surface thereof, obtained by using a resin mold for curable resin for multilayer optical recording information medium according to the present invention.
Figure 5B:
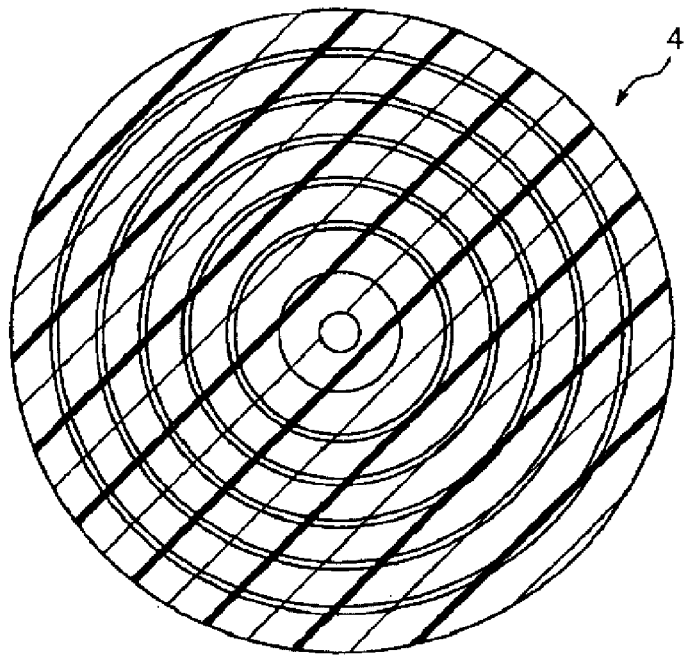
FIG. 5B is a plan view of the molded article in FIG. 5A observed from the above.

In accordance with the aforementioned steps, the molded article 4 of cured resin having grooves or a concavo-convex shape with high surface precision constituting a plate-shaped multilayer optical recording information medium, as shown in FIG. 5, can thus be obtained. FIG. 5A is a side view of the molded article 4 of cured resin having grooves or a concavo-convex shape with surface precision constituting a disk-shaped multilayer optical recording information medium, and FIG. 5B is a top view thereof.

(Heat Treatment)

For reusing the resin mold for curable resin in the present invention, the resin mold for curable resin after use in molding of the first molded article of the cured resin is heat-treated for 30 seconds to 100 hours at a temperature lower by 5 to 60° C. than the glass transition temperature of the resin composition.

The manner of heat treatment is not particularly limited insofar as the treatment involves heating for 30 seconds to 100 hours at a temperature lower by 5 to 60° C. than the glass transition temperature of the resin composition constituting the resin mold. The heating temperature is preferably 35° C. or more at normal pressures.

The heating temperature is more preferably lower by 10 to 40° C. than the glass transition temperature of the resin composition constituting the resin mold.

The heating time is more preferably in the range of 0.5 minute to 10 hours.

Examples of the heat treatment method may include a method of keeping the resin mold for curable resin in a heating container, a method of irradiating the resin mold for curable resin with infrared rays or far-infrared rays, and a method of irradiating the resin mold for curable resin with microwaves.

In the present invention, when the surface of the heat-treated resin mold for contacting the curable resin is measured with TOF-SIMS (time of flight-secondary ion mass spectrometry), the relative intensity of the maximum peak in the mass range of 150 to 300 (m/z) with respect to a peak with a mass of 67 (m/z) is preferably 0.05 or more, and more preferably in the range of 0.1 to 1.

The relative intensity of the maximum peak in the mass range of 150 to 300 (m/z) with respect to the peak with the mass of 67 (m/z) is calculated by measuring, with TOF-SIMS (time of flight-secondary ion mass spectrometry), the surface of the heat-treated resin mold for curable resin for contacting the curable resin (measurement conditions: measurement area, 200×200 μm$^2$; primary ion, Au$^+$; primary ion energy, 25 keV; target current; 0.5 PA (5 kHz); pixel, 128×128×74).

TOF-SIMS is mass spectrometry where the surface of a solid sample is bombarded by high-speed ion beams (primary ions) in high vacuum, thereby scattering components on the surface due to a sputtering phenomenon, and the time from when positively or negatively charged ions (secondary ions) thus generated are scattered in one direction till when the secondary ions are detected with a detector is measured for calculating the mass of the secondary ions. This method is an extremely highly accurate and highly sensitive analytical method in acquisition of information on a structure of the surface of a high molecular material or on a compound present in a minute amount.

The peak of mass 67 (m/z) is a peak of $C_5H_7^+$ fragment ion derived from the alicyclic structure-containing polymer, and the peak appearing in the mass range of 150 to 300 (m/z) is a peak derived from the hindered phenol compound.

When the surface of a molded article comprising only the alicyclic structure-containing polymer is measured in a similar manner, only a noise peak with a relative intensity of 0.0007 or less with respect to the peak of mass 67 (m/z) is observed in the mass range of 150 to 300 (m/z).

When the curable resin-contacted surface of the used, non-heat-treated resin mold for curable resin is measured with TOF-SIMS, no peak is detected in the mass range of 150 to 300 (m/z), or only a peak with a relative ratio of less than 0.05 with respect to the peak of mass 67 (m/z) is detected.

Before the heat-treated resin mold for curable resin is used in molding of the second molded article of cured resin, the heat-treated resin mold for curable resin is preferably cooled down to a predetermined temperature. The cooling method is not particularly limited, and may preferably be an air cooling method in which clean air is blown against the resin mold for curable resin, or a method in which the resin mold for curable resin is rotated at high speed in a clean atmosphere, in terms of preventing contamination of the resin mold for curable resin. The temperature of the resin mold for curable resin can be measured with an infrared radiation thermometer, and the temperature of the resin mold for curable resin after cooling is generally in the range of 20 to 30° C., preferably 22 to 28° C., more preferably 24 to 26° C., and fluctuation in the temperature of the resin mold for curable resin is preferably within ±0.5° C.

(Method for Producing Molded Articles of Cured Resin)

The method for producing the molded articles of the cured resin according to the present invention is characterized in that the method comprises:

(i) molding a first molded article of cured resin using a resin mold for the curable resin, the resin mold having been prepared by molding a resin composition containing an alicyclic structure-containing polymer and a hindered phenol compound, (ii) after use in the molding, heat-treating the resin mold for the curable resin, at a temperature lower by 5 to 60° C. than the glass transition temperature of the resin composition for a period of time in a range of 30 seconds to 100 hours, and (iii) molding a second molded article of the cured resin using the heat-treated resin mold for the curable resin.

The method for molding of the molded articles of cured resin using the heat-treated resin mold for curable resin is not particularly limited, and examples thereof may include the methods described in the aforementioned chapter "Molding of molded articles of cured resin using the resin mold for curable resin".

The resin mold for curable resin which has been subjected to the step (ii) retains transferability and mold removability of the resin mold for curable resin used in the step (i), and can thus be applied to production of a variety of molded articles of cured resin. After the step (iii) is finished, the steps (ii) to (iii) are further repeated, whereby one resin mold for curable resin can be used repeatedly 3 times or more, preferably 5 times or more.

The molded article of cured resin may preferably be used in optical parts requiring high surface precision of the concavo-convex shape.

Specific examples of the optical parts may include an optical lens, light guide plate, prism sheet, Fresnel lens, lenticular lens, optical disk, optical disk substrate, optical disk for blue laser, optical disk substrate for blue laser, magneto-optical disk, magneto-optical disk substrate, optical card substrate, light waveguide etc., and particularly preferable examples are diffusing or light focusing sheets and light guide plates, such as Fresnel lens, lenticular lens and prism sheet.

EXAMPLES

The present invention will be explained below in more detail with reference to following Examples and Comparative Examples, although the present invention is not limited thereto.

Parts and percentages (%) are given by weight and pressure is given by gauge pressure, unless otherwise specified.

In the following Preparative Examples, Examples and Comparative Examples, measurements for physical properties were performed as follows:

[Weight-average Molecular Weight (Mw)]

Determined as polyisoprene-equivalent molecular weight by gel permeation chromatography (GPC) with cyclohexane as solvent.

[Degree of Hydrogenation of Main Chain (%) and Degree of Hydrogenation of Aromatic Ring (Degree of Hydrogenation of Nucleus (%))]

Determined by $^1$H-NMR.

[Glass Transition Temperature (Tg (° C.))]

Determined in accordance with JIS-K 7121 with a differential scanning calorimeter under the condition of a temperature increasing rate of 10° C./min.

[Appearance Observation of the Resin Mold for Curable Resin]

The surface (on the side having concavo-convex shapes, that is, the side for contacting the curable resin) of the resin mold for curable resin just before attaching to an UV-curable resin composition was visually observed and simultaneously observed under a polarized-light microscope.

Visual recognition of debris on the surface having concavo-convex shapes of the resin mold for curable resin was evaluated as "Poor"; scarce recognition of debris when observed with the polarized-light microscope at 50× magnification was evaluated as "Moderate"; scarce recognition of debris when observed with the polarized-light microscope at 200× magnification was evaluated as "Good"; and no recognition of debris when observed with the polarized-light microscope at 200× magnification was evaluated as "Very-Good".

[Measurement with TOF-SIMS (Time of Flight-secondary Ion Mass Spectrometry)]

The surface of the resin mold for curable resin for contacting the curable resin was measured with a time of flight-secondary ion mass spectrometry (TOF-SIMS.4 manufactured by ON-TOF) under the following measurement conditions: measurement area, 200×200 μm$^2$; primary ion, Au$^+$; primary ion energy, 25 keV; target current, 0.5 PA (5 kHz); and pixel, 128×128×74, to determine the relative intensity of the maximum peak in the mass range of 150 to 300 (m/z) to the peak of mass 67 (m/z).

Evaluation was made in accordance with the following: relative intensity of 0.005 or more was evaluated as "Good", relative intensity of less than 0.005 and 0.003 or more was evaluated as "Moderate", and relative intensity of less than 0.003 was evaluated as "Bad".

[Evaluation of Mold Removability]

As shown in FIG. 7, the load for peeling upon removal of the resin mold for curable resin from the molded article of cured resin was determined by measuring, with a delamination tester (universal tensile compression tester, TCM-500CR, manufactured by Minebea Co., Ltd.), the peeling loading required for raising the mold resin for curable resin in the direction of the arrow.

A peeling loading of less than 15 N was evaluated as "Good", a peeling loading of not less than 15 N and less than 30 N was evaluated as "Moderate", and a peeling loading of 30 N or more was evaluated as "Bad".

A low peeling loading is indicative of excellent mold removability.

[Test of Transferability of the Molded Article of Cured Resin]

The height (nm) of the concavo-convex shape on the surface of the molded article of cured resin after removal from the mold was measured by an atomic force microscope (AFM) (Nano ScoPe IIIa manufactured by Veeco Instruments).

The degree of transfer (%) is a value (%) obtained by multiplying the height (nm) of the concavo-convex shape on the surface of the molded article of cured resin by the shrinkage degree (1.094) of the curable resin and then dividing the product by the height (160 nm) of the concave-convex shape of a metal stumper used in molding of the resin mold for curable resin (degree of transfer (%)=(height of the concavo-convex shape on the surface of the molded article of cured resin)×1.094/160×100).

[Appearance Observation of the Molded Article of Cured Resin]

The appearance of the surface with the concavo-convex shape on the resulting molded article of cured resin was visually observed and simultaneously observed under a polarized-light microscope.

Visual recognition of debris on the surface having concavo-convex shapes of the resin mold for curable resin was evaluated as "Poor"; scarce recognition of debris when observed with the polarized-light microscope at 50× magnification was evaluated as "Moderate"; scarce recognition of debris when observed with the polarized-light microscope at 200× magnification was evaluated as "Good"; and no recognition of debris when observed with the polarized-light microscope at 200× magnification was evaluated as "Very-Good".

(Production of an Alicyclic Structure-containing Polymer)

Preparative Example 1

0.82 part of 1-hexene, 0.15 part of dibutyl ether and 0.30 part of triisobutyl aluminum were introduced into, and mixed with, 500 part of dehydrated cyclohexane under a nitrogen atmosphere in a reaction container at room temperature. Then keeping the temperature of the mixture at 45° C., 170 part of tricyclo[4.3.0.1$^{2,5}$]deca-3,7-diene (trivial name: dicyclopentadiene, hereinafter abbreviated as "DCP"), 30 part of 8-ethyl-tetracyclo[4.4.0.1$^{2,5}$.1$^{7,10}$]dodec-3-ene (hereinafter, "ETCD") and 80 part of tungsten hexachloride (0.7% solution in toluene) were continuously added over 2 hours, thereby polymerizing the mixture. 1.06 part of butyl glycidyl ether and 0.52 part of isopropyl alcohol were then added to the polymer solution thereby inactivating the polymerization catalyst to terminate the polymerization reaction. The reaction solution containing the resulting DCP/ETCD ring-opened copolymer was analyzed by gas chromatography. As a result, the degree of conversion of each monomer was 99.5%.

270 part of cyclohexane were then added to 100 part of the reaction solution containing the resulting ring-opened polymer, and 5 part of diatomite-supported nickel catalyst (degree of nickel content, 58 wt %; pore volume 0.25 ml/g, specific surface area 180 m$^2$/g) were added thereto as a hydrogenation catalyst. The mixture was pressurized at 5 MPa with hydrogen under stirring and simultaneously heated to a temperature of 200° C., and then reacted for 8 hours to give a reaction solution containing a hydride of the DCP/ETCD ring-opened copolymer. The hydrogenation catalyst was removed by filtration. Then the solvent cyclohexane and other volatile components were removed from the solution at a temperature of 270° C. at a pressure of 1 kPa or less by using a cylindrical concentrating drying apparatus (manufactured by Hitachi, Ltd.). Then the DCP/ETCD ring-opened copolymer hydride in a molten state was extruded through an extruder into strands which were then cooled and pelleted to give pellet PM.

The Mw of this pelleted ring-opened copolymer hydride (alicyclic structure-containing polymer) was 30,000. The proportion of unsaturated bonds in carbon-carbon bonds in the polymer was 0.0029%, the Tg was 100° C., the specific gravity was 1.01 g/cm³, and the content of metal atoms, in terms of the total content of aluminum, tungsten and nickel, was 1 ppm or less.

(Production of Resin Molds for Curable Resin)

Preparative Example 2-1

0.05 part of a soft polymer (Toughtec H1052 manufactured by Asahi Kasei Corporation) and 0.3 part of 1,6-hexanediol-bis[3-(3,5-di-t-butyl-4-hydroxyphenyl) propionate] (Irganox 259 manufactured by Ciba-Geigy) as hindered phenol compound were added to 100 part of the alicyclic structure-containing polymer (Pellet PM) obtained in the Preparative Example 1. The mixture was then kneaded by a twin-screw kneader (TEM-35B manufactured by Toshiba Machine Co., Ltd.; screw diameter, 37 mm; L/D=32; number of revolutions of a screw, 250 rpm; resin temperature, 240° C.; feed rate, 10 kg/hour) and then extruded to give pellet P1 of the resin composition. The glass transition temperature of pellet P1 was 100° C.

The resulting pellet P1 was molded by a resin molding apparatus shown in FIG. 6, to give five resin molds for curable resin S1 (diameter 120 mm, thickness 0.6 mm).

The resin molding apparatus shown in FIG. 6 is a thermoplastic resin molding apparatus equipped with an air-carrier type resin carrier device (not shown), a resin storage cylinder 46, a breather valve 47, an inert gas injection device 42, and a plasticization device 55. In the air-carrier type resin carrier device, a bottom of a carrier air/resin separator 53 is connected to the top of the resin storage cylinder. The breather valve 47 is connected to the upper portion of the resin storage cylinder. A raw material feeding opening of the plasticization device 55 is connected to the bottom of the resin storage cylinder, and an inert gas injection device 42 is arranged in the vicinity of the raw material feeding opening of the plasticization device 55, and a ground packing 50 coated with vacuum grease is arranged between a screw bearing 49 and screw 52.

An injection molding machine (SD40ER manufactured by Sumitomo Heavy Industries, Ltd.) equipped with a metal stumper (height of concavo-convex shape: 160 nm) for recording DVD was used as plasticization device 55.

BR-205 (HEPA) manufactured by Fuji Engineering Co., Ltd. was used as breather valve 47. The screw 52 used in the injection molding machine was coated with aluminum titanium nitride.

The molding conditions are as follows: The resin molding device was arranged in a clean room with class 6 as cleanness degree, and the temperature (preset barrel maximum temperature) was 360° C., and the metal mold temperature was 90° C. in either the fixed side or mobile side. Just before molding, the resin composition had been heat-treated at 80° C. for 4 hours in a drying machine. As the inert gas, nitrogen of 99.99% purity was used and introduced at a feed rate of 10 L/min.

Preparative Example 2-2

Pellet P2 and resin mold for curable resin S2 were obtained in the same manner as in the Preparative Example 2-1 except that the amount of the hindered phenol compound added was changed from 0.3 part to 3.0 parts. The glass transition temperature of pellet P2 was 98° C.

Preparative Example 2-3

Pellet P3 and resin mold for curable resin S3 were obtained in the same manner as in the Preparative Example 2-1 except that the hindered phenol compound was not used. The glass transition temperature of pellet P3 was 100° C.

Preparative Example 2-4

Pellet P4 and resin mold for curable resin S4 were obtained in the same manner as in the Preparative Example 2-1 except that 0.3 part of pentaerythritol tetrakis[3-(3,5-di-t-butyl-4-hydroxyphenyl) propionate] (Irganox 1010 manufactured by Ciba-Geigy) was added as the hindered phenol compound in place of 0.3 part of 1,6-hexanediolbis[3-(3,5-di-t-butyl-4-hydroxyphenyl) propionate] (Irganox 259 manufactured by Ciba-Geigy). The glass transition temperature of pellet P4 was 100° C.

Preparative Example 2-5

Pellet P5 and resin mold for curable resin S5 were obtained in the same manner as in the Preparative Example 2-1 except that 0.3 part of n-octadecyl-β-(4'-hydroxy-3',5'-di-t-butylphenyl) propionate (Irganox 1076 manufactured by Ciba-Geigy) was added as the hindered phenol compound in place of 0.3 part of 1,6-hexanediolbis[3-(3,5-di-t-butyl-4-hydroxyphenyl) propionate] (Irganox 259 manufactured by Ciba-Geigy) The glass transition temperature of pellet P5 was 100° C.

Example 1

The appearance observation of an arbitrary one of the resin molds for curable resin S1 obtained in the Preparative Example 2-1 and the measurement thereof with TOF-SIMS were conducted. The results are shown in Table 1.

[Production of Molded Articles of Cured Resin]

Curable resin (UV curable resin SD-347, shrinkage degree of 9.4%, manufactured by Dainippon Ink And Chemicals, Incorporated) was applied onto a disk-shaped polycarbonate substrate by spin coating, to form a curable resin layer. Onto the curable resin layer, the resin mold for curable resin S1 (other than the one used in the appearance observation and TOF-SIMS measurement described above) was attached such that the side of the resin mold having a concavo-convex shape was faced to the curable resin layer.

The side of the resin mold for curable resin was then irradiated for 3 seconds with ultraviolet rays with an irradiation intensity of 100 mW/cm² from a UV irradiation device (model name: UVH-0251C, manufactured by Ushio, Inc.), whereby the curable resin layer was cured, to give a complex of the polycarbonate substrate/cured resin layer/resin mold for curable resin.

Thereafter, the resin mold for curable resin was removed, whereby a molded article of cured resin constituting one-side bilayer recording DVD substrate as shown in FIG. 5 was obtained. The appearance observation of the resulting molded article of cured resin was conducted.

The resin mold for curable resin after removal was heat-treated at 80° C. for 10 minutes in a heating oven.

After heat treatment, the resin mold for curable resin was cooled to 25° C. by blowing clean air against the mold. The mold was then repeatedly subjected to attachment to curable resin, curing, mold removal and heat treatment in the same manner as described above. At the time of 5th mold removal, the mold removability was evaluated, and the resulting molded article of cured resin was subjected to the transferability test. The results are shown in Table 1.

Example 2

A molded article of cured resin was produced in the same manner as in the Example 1 except that the resin mold for curable resin S2 was used in place of the resin mold for curable resin S1. The results are shown in Table 1.

Example 3

A molded article of cured resin was produced in the same manner as in the Example 1 except that the resin mold for curable resin S4 was used in place of the resin mold for curable resin S1, and the heat treatment was conducted under the conditions of a temperature of 50° C. and a period of 30 minutes. The results are shown in Table 1.

Example 4

A molded article of cured resin was produced in the same manner as in the Example 1 except that the resin mold for curable resin S5 was used in place of the resin mold for curable resin S1, and the heat treatment was conducted under the conditions of a temperature of 40° C. and a period of 80 hours. The results are shown in Table 1.

Comparative Example 1

A molded article of cured resin was produced in the same manner as in the Example 1 except that the heat treatment was not conducted. The results are shown in Table 1.

Comparative Example 2

A molded article of cured resin was produced in the same manner as in the Example 1 except that the heat treatment was conducted under the conditions of a temperature of 30° C. and a period of 10 minutes. The results are shown in Table 1.

Comparative Example 3

A molded article of cured resin was produced in the same manner as in the Example 1 except that the resin mold for curable resin S3 was used in place of the resin mold for curable resin S1. The results are shown in Table 1.

TABLE 1

|  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Hindered phenol compound | Type | Irganox 259 | Irganox 259 | Irganox 1010 | Irganox 1076 | Irganox 259 | Irganox 259 | — |
|  | Compounding amount (part) relative to 100 parts of alicyclic structure-containing polymer | 0.3 | 3 | 0.3 | 0.3 | 0.3 | 0.3 | — |
| Heat treatment | Temperature | 80° C. | 80° C. | 50° C. | 40° C. | — | 30° C. | 80° C. |
|  | Time | 10 minutes | 10 minutes | 30 minutes | 80 hours | — | 10 minutes | 10 minutes |
| (Appearance check of resin mold for curable resin)/(TOF-SIMS relative intensity) | Unused mold | VeryGood/ Good | Good/ Good | VeryGood/ Good | VeryGood/ Good | VeryGood | VeryGood | VeryGood |
|  | Mold before second-time use (after heat treatment) | VeryGood/ Good | Good/ Good | VeryGood/ Good | VeryGood/ Good | VeryGood/ Poor | Poor/ Moderate | VeryGood/ Poor |
|  | Mold before third-time use (after heat treatment) | VeryGood/ Good | Good/ Good | VeryGood/ Good | VeryGood/ Good | VeryGood/ Poor | Poor/ Moderate | — |
|  | Mold before fourth-time use (after heat treatment) | VeryGood/ Good | Good/ Good | VeryGood/ Good | VeryGood/ Good | — | Poor/ Moderate | — |
|  | Mold before fifth-time use (after heat treatment) | VeryGood/ Good | Good/ Good | VeryGood/ Good | VeryGood/ Good | — | Poor/ Moderate | — |
| Peeling loading at the time of fifth mold removal |  | Good | Good | Good | Good | — | Poor | — |
| Appearance check of molded product of curable resin | Product of first-time use | VeryGood | Good | VeryGood | VeryGood | VeryGood | VeryGood | Poor |
|  | Product of second-time use | VeryGood | Good | VeryGood | VeryGood | Poor | Moderate | Not peeled |
|  | Product of third-time use | VeryGood | Good | VeryGood | VeryGood | Not peeled | Moderate | — |
|  | Product of fourth-time use | VeryGood | Good | VeryGood | VeryGood | — | Moderate | — |
|  | Product of fifth-time use | VeryGood | Good | VeryGood | VeryGood | — | Moderate | — |
| Transferability of molded product of curable resin from the resin mold in fifth-time use |  | 99% | 98% | 99% | 99% | — | 30% | — |

Table 1 indicates the followings facts.

The transferability and mold removability do not decrease in the method for producing molded articles of cured resin wherein (1) the resin mold for curable resin is prepared by molding a resin composition comprising an alicyclic structure-containing polymer and a hindered phenol compound, (2) the resin mold for curable resin after use is heat-treated for 30 seconds to 100 hours at a temperature lower by 5 to 60° C. than the glass transition temperature of the resin composition used in the resin mold, and (3) the heat-treated resin mold for curable resin is used in molding of a molded article of cured resin (Examples 1 to 3). In the method for producing molded articles of cured resin which does not involve heat treatment, on the other hand, the resin mold for curable resin cannot be used two or more times due to deterioration in transferability and mold removability (Comparative Example 1). When the heat treatment temperature is a temperature lower by 60° C. or more than the glass transition temperature of the resin composition used in the resin mold (the glass transition temperature of the resin composition, 100° C.; the heat treatment temperature, 30° C.), the transferability and mold removability are deteriorated (Comparative Example 2). When a resin mold for curable resin prepared by molding a resin composition which does not contain a hindered phenol compound is used, the resin mold for curable resin cannot be used repeatedly two or more times due to deterioration in transferability and mold removability (Comparative Example 3).

The invention claimed is:

1. A method for producing molded articles of cured resin, the method comprising:
   (i) molding a first molded article of cured resin using a resin mold for the curable resin, the resin mold having been prepared by molding a resin composition containing an alicyclic structure-containing polymer and a hindered phenol compound, wherein the content of the hindered phenol compound in the resin composition is in a range of 0.2 to 0.9 wt % based on the total amount of the resin composition,
   (ii) after use in the molding, heat-treating the resin mold for the curable resin, at a temperature lower by 5 to 60° C. than the glass transition temperature of the resin composition for a period of time in a range of 30 seconds to 100 hours, and
   (iii) molding a second molded article of the cured resin using the heat-treated resin mold for the curable resin.

2. The method for producing molded articles of cured resin according to claim 1, wherein when a surface of the heat-treated resin mold for the curable resin, said surface being for contacting the curable resin, is measured with TOF-SIMS (time of flight secondary ion mass spectrometry), the relative intensity of the maximum peak in the mass range of 150 to 300 (m/z) with respect to a peak with a mass of 67 (m/z) is 0.05 or more.

3. The method for producing molded articles of cured resin according to claim 1, wherein the resin mold for the curable resin has a concavo-convex shape on a surface thereof, said surface being for contacting the curable resin.

4. The method for producing molded articles of cured resin according to claim 1, further comprising a step (iv) of, after finishing the step (iii), repeating the steps (ii) to (iii).

5. The method for producing molded articles of cured resin according to claim 1, wherein the melt mass flow rate (MFR) of said alicyclic structure-containing polymer is in a range of 1 to 100 g/10 min.

6. The method for producing molded articles of cured resin according to claim 1, wherein the molecular weight of said hindered phenol compound is in a range of 300 to 2000.

* * * * *